United States Patent
Charlesworth

[15] 3,686,463
[45] Aug. 22, 1972

[54] METHOD OF MULTIPLE SPOT WELDING

[72] Inventor: Eric Charlesworth, Sheffield, Great Britain

[73] Assignee: Robert Jenkins & Company Limited, Rotherham, Great Britain

[22] Filed: June 8, 1970

[21] Appl. No.: 44,487

[30] Foreign Application Priority Data

June 10, 1969  Great Britain..........29,389/69

[52] U.S. Cl. ..............................219/127, 219/125 R
[51] Int. Cl. ...........................................B23k 9/12
[58] Field of Search ......219/125 R, 124, 127, 131 R, 219/135, 137

[56] References Cited

UNITED STATES PATENTS 3,390,250  6/1968  Apblett et al...............219/125
3,118,052  1/1964  Lippart et al..............219/137
3,350,534  10/1967  Libby.....................219/124 X
3,114,829  12/1963  Libby........................219/124

FOREIGN PATENTS OR APPLICATIONS 1,170,113  11/1969  Great Britain.............219/137

Primary Examiner—J. V. Truhe
Assistant Examiner—L. A. Schutzman
Attorney—Lackenbach and Lackenbach

[57] ABSTRACT

The invention relates to a method of and apparatus for electric welding using a non-consumable electrode. It envisages the modulated movement of an electrode so that it moves in regular increments and produces a continuous weld constituted by a series of spot welds which overlap by a predetermined and regular extent, and may include also the modulation of electric current in combination with the modulated movement of the electrode.

6 Claims, 8 Drawing Figures

Patented Aug. 22, 1972

INVENTOR
ERIC CHARLESWORTH
BY
Lackenbach & Lackenbach
ATTORNEYS

INVENTOR
ERIC CHARLESWORTH
BY
Lackenbach & Lackenbach
ATTORNEYS

INVENTOR
ERIC CHARLESWORTH
BY
Lackenbach & Lackenbach
ATTORNEYS

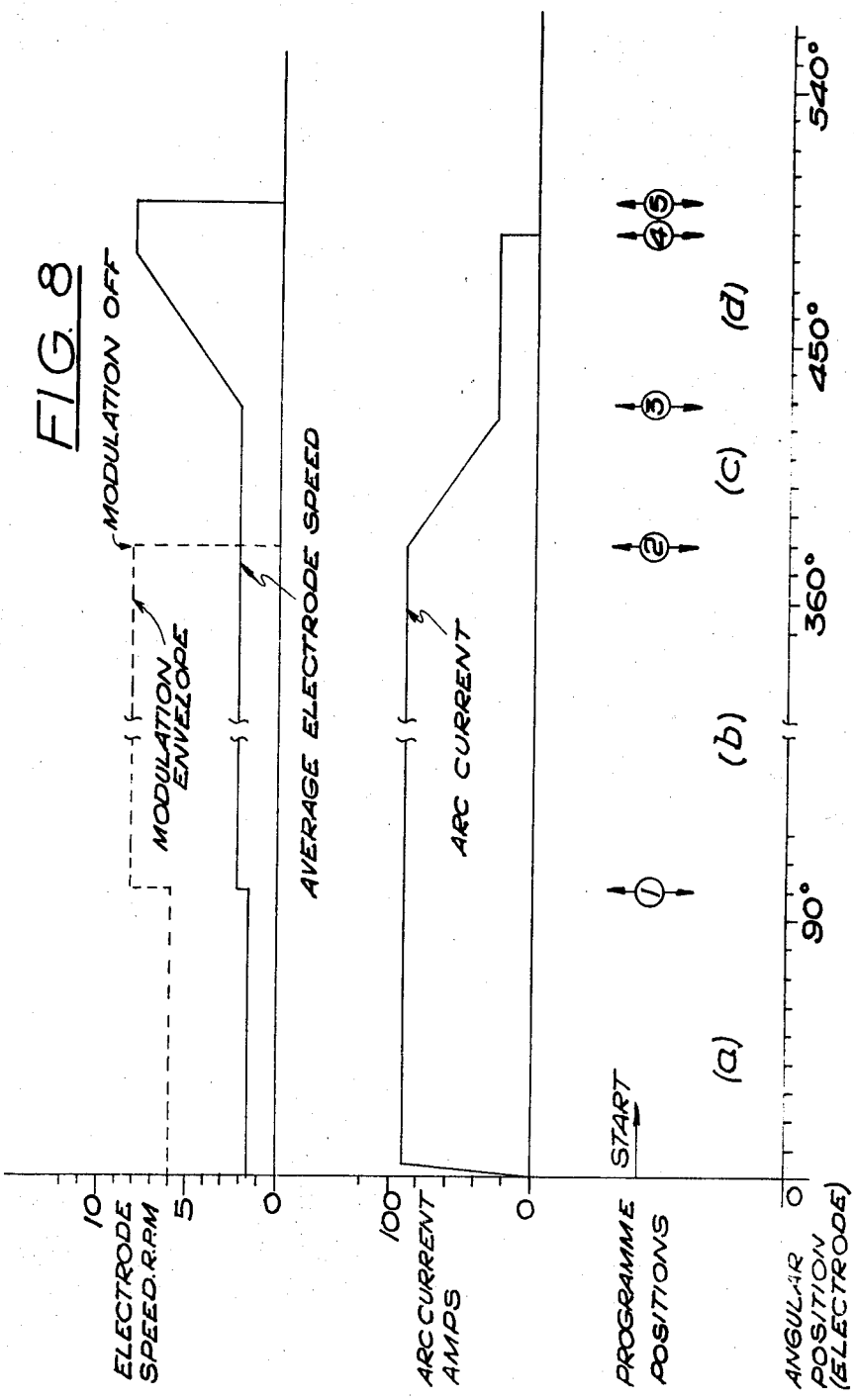

METHOD OF MULTIPLE SPOT WELDING

The invention relates to electric welding and has for its object to provide an improvement therein.

In particular, the invention relates to so-called "-Tungsten Inert Gas" welding and facilitates the carrying out of programmed welding whereby welds of repeatable quality and profile can be made so that product quality is consistently high. The invention is particularly applicable to circumferential welding, for example the welding of tubes to tube plates in the manufacture of high pressure heat exchangers.

According to one aspect of the invention, there is provided a method of electric welding, using a non-consumable electrode, which includes the step of imparting a modulated movement to an electrode so that it moves in regular increments so as to produce a continuous weld constituted by a series of spot welds which overlap by a predetermined and regular extent. (By modulated movement is herein meant a movement which is not constant but which is varied at regular intervals of time, either by the rate of movement being reduced to zero at these time intervals or by the rate of movement being varied at these time intervals; and the term spot welds is herein to be taken to include welds akin to spot welds). The degree of overlap expressed as a percentage of the size of each spot weld will be in excess of 10 percent and less than 90 percent and will be determined according to the composition and thickness of the material being welded, and the electric power being used. Other ranges of overlap may be employed, for example ranges of, say, 25–75%, 40–60% and 45–55%, depending upon the size of each spot weld, and upon the degree of overlap, the extent of angular movement of the electrode in successive increments may be variable from, say, 0.25° to 20°. As an example of this, when welding a tube of say ¾inch diameter successive angular movements of the electrode may be of one degree, in linear measurement amounting to approximately six thousandths of an inch. The time cycle, that is to say, the periods of time between successive increments of movement of the electrode, will be determined according to the amount of movement imparted to the electrode in successive increments, the composition and thickness of the material being welded, and the electric power being used, and will generally lie within the range one tenth of a second of two seconds, although time cycles outside this range may be used, for example lying within the range one fiftieth of a second to 4 seconds. It may be found that other ranges of time cycle are adequate to cover the time cycles which are useful in practice or for welding a particular range or thickness of material, for example, cycle times within the ranges one twenty fifth of a second to three seconds, one fifth of a second to one second, one third of a second to three quarters of a second and two fifths of a second to three fifths of a second. The welding is generally carried out in an inert atmosphere. The method may also include the modulation of electric current in combination with the modulated movement of the electrode, that is to say in step with the modulated movements of the electrode, the electric peaks taking place during the periods in which the electrode is moving at a reduced speed or is stationary.

According to a further aspect of the invention, there is provided a method of electric welding tubes of a heat exchanger to a tube plate (sometimes called a tube sheet) the welding being carried out according to the method described above. The method can be employed for butt welding the heat exchanger tubes to their tube plates or for welding the tubes at the front or back in cases where they project right through their tube plates. (Back welding is sometimes called bore welding or back face welding).

According to a still further aspect of the invention, there is provided apparatus for performing the methods above referred to, the apparatus including a holder for an electrode, means for conveying electric current to such electrode and means for imparting a modulated movement to the holder so that it can impart movement in regular increments so as to produce a continuous weld constituted by a series of spot welds which overlap by a predetermined and regular extent. The apparatus will also preferably include means for varying the modulated movement of the electrode, that is to say, for varying the general rate of movement of the electrode, for setting the modulation cycle time and for setting the modulation bias either forwardly or rearwardly. The apparatus may also include means for modulating the electric power conveyed to the electrode, that is to say, increasing and decreasing the electric power at regular intervals of time in step with the modulated movement of the electrode.

In order that the invention may be fully understood and readily carried into effect, the same will now be described, by way of example only, with reference to the accompanying drawings, of which:

FIGS. 4, 5 and 6 are circuit diagrams of parts of the apparatus which will presently be referred to;

FIG. 8 is a diagram illustrating a typical welding program which can be employed using this further apparatus.

Figure 1:
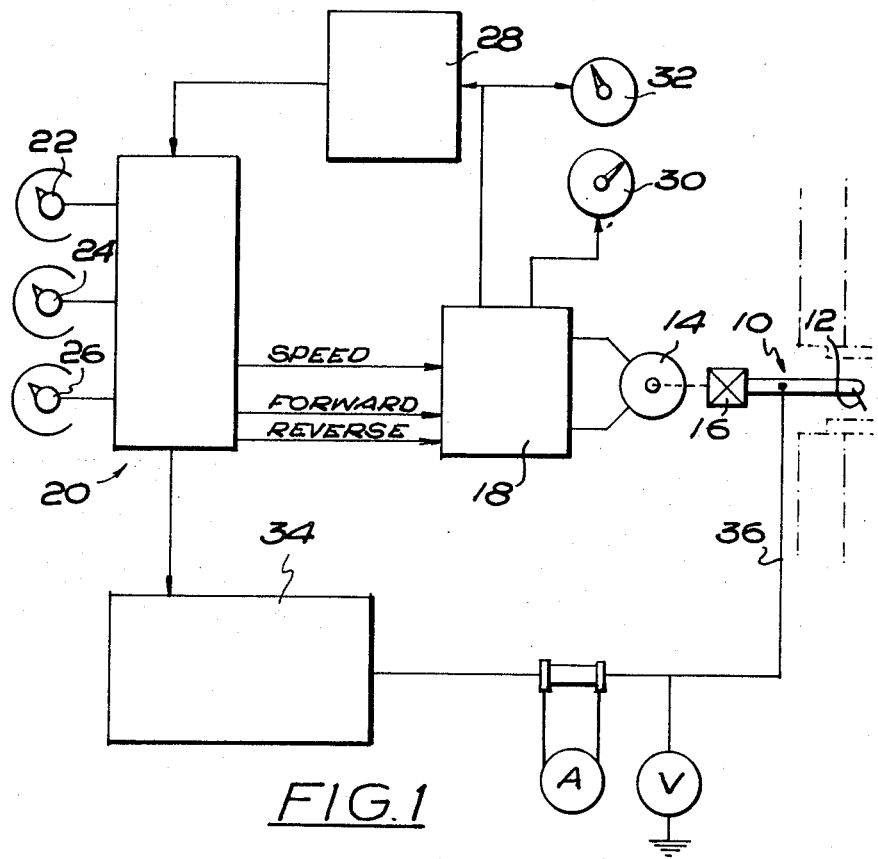
FIG. 1 is a diagrammatic illustration of apparatus embodying the invention for welding the tubes of a heat exchanger to their tube plates.
Figure 2:
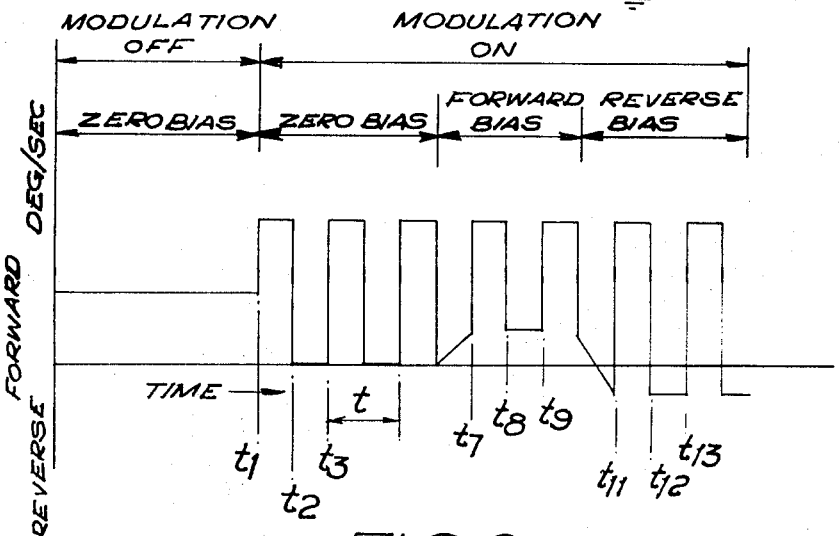
FIG. 2 is a graph which illustrates the effects of various controls present in the apparatus of FIG. 1.

Referring now to FIGS. 1 and 2 of the drawings, the apparatus there illustrated includes a mandrel or holder 10 carrying at its forward end a non-consumable electrode 12. As shown in chain-dotted lines, the electrode extends into one end of a heat exchanger tube which has been entered into a hole in a tube plate. The arrangement is such that as the mandrel rotates, moving the electrode around within the bore of the tube, the arc which is produced between the electrode and the bore of the tube generates intense heat and locally melts the wall of the tube and the adjacent area of the tube plate so that the two are fused together. (Ideally, of course, the weld will be such that the tube and the tube plate are melted along the whole of the surface at which they touch). An electric motor 14 is provided for rotating the mandrel by way of a gearbox 16.

Means for controlling the motor in a predetermined manner to drive the mandrel with a modulated rotational movement comprises a motor control translator 18 under the control of control logic generally indicated 20. The control logic includes three adjustable controls, an electrode speed control 22, a modulation cycle time control 24 and a modulation bias control 26. Program logic 28 is associated with the motor control translator and with the control logic. A tachometer 30 is provided to show the speed of the mandrel in degrees per second and a further dial indicator 32 is provided to show the position of the electrode at any particular instant.

A welding power source with an associated ammeter A and voltmeter V is indicated diagrammatically at 34 connected to the electrode by means of a cable 36.

In operation, the electrode is advanced into a bore in a tube plate into which a tube is to be welded and the mandrel is rotated so that the free end of the electrode is moved around the inside surface of the tube. When the electric current is switched on an arc is produced between the electrode and the surface of the tube which is of sufficient intensity to melt the metal of the tube and the metal into which the tube is spigoted so that the tube and the tube plate are fused together.

It has been found that an improved weld is produced if the movement of the electrode is modulated, that is to say, not constant but varied at regular intervals of time, either by the rate of movement being reduced to zero at these time intervals or by the rate of movement being different from the general rate of movement at these time intervals. This modulated movement can be brought about by the controls 22, 24 and 26.

FIG. 2 is a graph which plots rate of movement in degrees per second against time. In a first part of the graph with no modulation the electrode is shown to be moving at a constant speed. At a time $t_1$, however, modulation is shown to have been brought into effect so that initially, that is from $t_1$ to $t_2$, the rate of movement of the electrode has been doubled and then from $t_2$ to $t_3$ its rate of movement has been reduced. The modulation in this case is such that the amount of increase is equal to the amount of decrease, and consequently between $t_2$ and $t_3$ the electrode is stationary. Consequently, at such intervals of time and in periods of "dwell" the parts of the work in the region of the free end of the electrode are heated to a greater degree than intermediate parts of the work. It will be understood therefore that the peaks of the graph represent periods of relatively fast movement of the electrode and that the lowermost portions of the graph represent the periods of "dwell" (which may or may not be periods of zero movement represented by the base line of the graph).

In a further part of the graph, the modulation of the electrode movement has "forward bias", that is to say, the amount of increase is greater than the amount of decrease and between the points $t_8$ and $t_9$ the electrode is not quite stationary although it is moving at a very much reduced rate so that the effect is substantially the same as before. In other words, the electrode is again moving at a rate which is not constant so that at regular intervals of time and in periods of "dwell" the parts of the work in the region of the free end of the electrode at those intervals of time are heated to a greater degree than intermediate parts of the work.

In a still further part of the graph, the modulation of the electrode movement has "reverse bias", that is to say, the amount of increase is less than the amount of decrease and, for example, between the points $t_{12}$ and $t_{13}$ the electrode is actually moving in reverse, although at a very slow rate. Consequently, as before, at such intervals of time, the parts of the work in the region of the free end of the electrode are heated to a greater degree than intermediate parts of the work.

In each case the effect of this modulation is in many ways the same as if the electrode were moved at a constant rate with the electric power being increased and decreased at regular intervals of time, and weld penetration is increased locally in the regions where "dwell" occurs. It has been found that a good weld is produced, and that the quantity of metal molten at any one time is less than if the electrode is moved at a constant rate with a constant electric power being used. In the result there is produced a continuous weld constituted by a series of spot welds which overlap by a predetermined and regular extent. In one important respect, however, the modulation of electrode movement is preferable to modulation of electric power even though the resulting weld may be similar. This is that changes in current affect the arc characteristics, and current induced magnetic fields are known to cause arc deflection. Consequently, modulation of the electric power can cause a physical shift in the position of the weld pool and the point of penetration, and in cases where the point of penetration is critical, for example, in the welding of tubes to tube plates of heat exchangers, it has been found advantageous to modulate the rate of electrode movement and to maintain the arc current constant.

It will be understood that when using the apparatus illustrated in FIG. 1 the general rate of movement of the electrode can be adjusted by means of the control 22, the forward or rearward modulation bias can be adjusted by means of the control 26 and the cycle time between successive modulations can be adjusted by means of the control 24. The motor is in this case a so-called stepping motor and the arrangement is such that when the electrode had initially been moving at a constant rate, i.e. without modulation, the controls can be adjusted so that for example at a first modulated setting the electrode will move at twice the initial rate of movement for, say, one second and will then be stationary for an equal period of time. It will, however, be understood the other types of electric motors may be used if desired.

Figure 3:
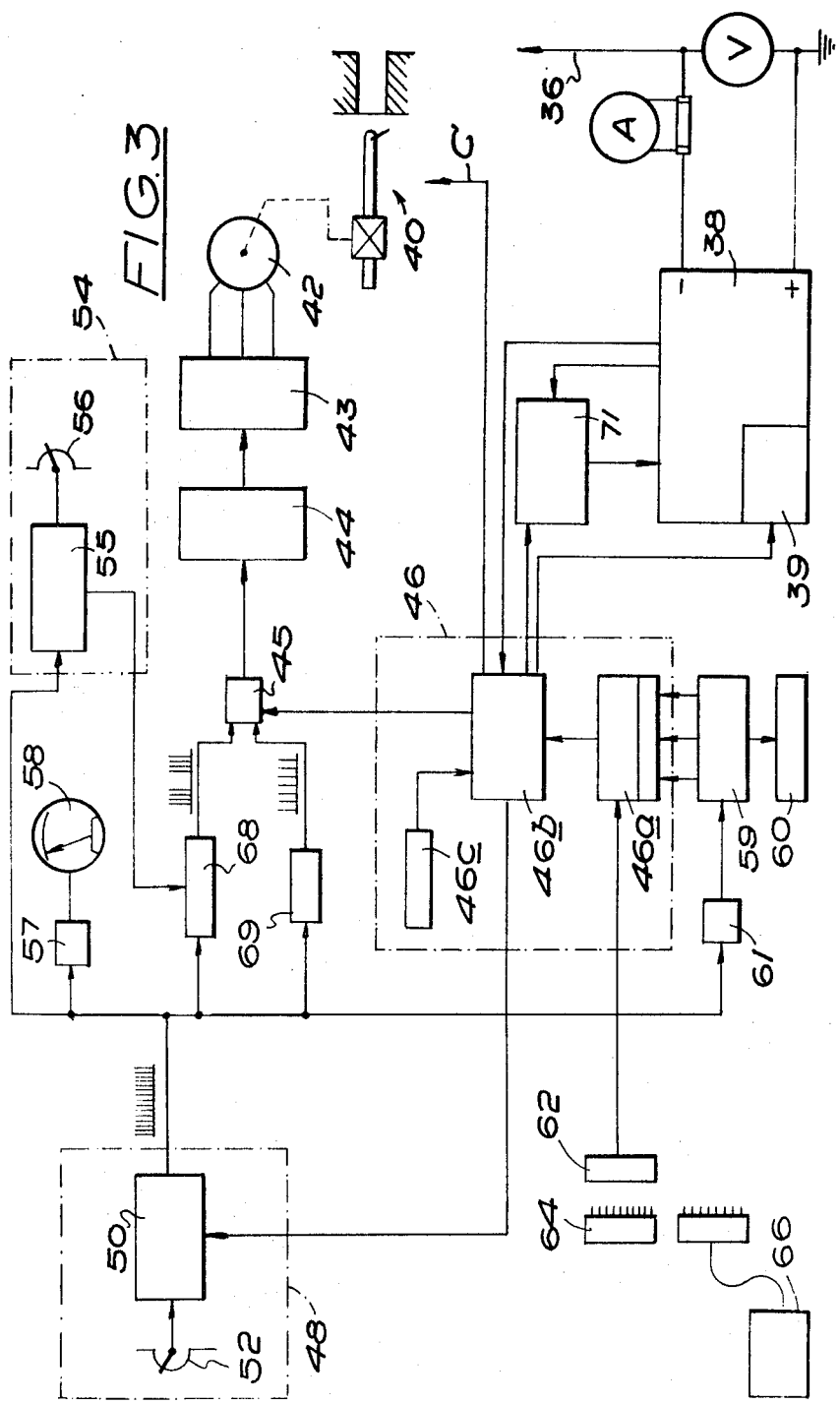
FIG. 3 is a diagrammatic illustration of further apparatus embodying the invention, again for welding the tubes of a heat exchanger to their tube plates.

However, referring now to FIGS. 3 to 7, of the drawings, there is illustrated further apparatus by means of which welding can be carried out using both modulated electrode movement and modulated current control simultaneously. Referring in particular to FIG. 3, the further apparatus includes a conventional transductor controlled welding power source 38 having an associated ammeter A and voltmeter V and having a drooping output characteristic and also incorporating a high frequency arc starter 39 for arc initiation. A welding gun 40 provided with interchangeable water cooled mandrels is driven by a precision stepping motor 42. The motor 42 is energized from a power amplifier 43 which in turn is fed from a motor control translator 44. The translator 44 is controlled from command logic indicated by the chain line block 46. The command logic 46 includes program logic 46*a*, control logic 46*b* and operator controls 46*c*. The control logic 46*b* has one output controlling a switch 45. An electrode speed control unit indicated by the chain line block 48 includes a voltage/frequency pulse generator 50 and a control potentiometer 52. The generator 50 is supplied from an output of the control logic 46b. An electrode movement modulation control is indicated by the chain line block 54 and includes a control potentiometer 56 and a modulation control unit 55. The control unit 55 has an input connected to the output of the electrode speed control unit 48. The output of the electrode speed control 48 is also connected to a tachometer 58 via an integrating circuit 57, the tachometer 58 giving an indication of electrode speed throughout the operation of the apparatus. The output of the control 48 is also connected to a decimal counter 59 via a dividing circuit 61. A numerical read out 60 is connected to the decimal counter 59 and indicates the actual position of the electrode at any particular time. The output of the control 48 is also connected to a gate 68 and a dividing circuit 69 both of which are connected to the change-over switch 45. The modulation control unit is also connected to an input of the gate 68. A current control amplifier 71 is connected between the control logic 46b and the welding power source 38. Feedback is provided from the welding power source to the control logic 46b and to the current control amplifier 71. Electrode adjustment is provided by means of a cable C connected to the control logic 46b. The control logic 46b is also connected to the change-over switch 45. The program logic is connected to a program socket 62 to which either a program plug 64 or program simulator 66 can be connected.

The D.C. power source has a current range of 25 to 180 amps with an open circuit voltage of 70 volts, the transductor control provides a low level input voltage control with linear input-output characteristics.

A wide electrode speed range and control flexibility is made possible by the use of a precision stepping motor; the shaft of the motor moves in discrete angular steps and has an inherent locking action and so allows a direct digital drive method to be employed. By including a digital counter operating from the motor control pulses, it is possible to have a remote memory and display of the angular position of the motor shaft or welding electrode. The stepping motor has a permanent magnet rotor and a stator with two sets of center tapped windings; the windings are energized in a particular sequence—the order of this sequence decides the direction of rotation and at each step in the sequence, the rotor or shaft moves through 1.8° or 200 steps per revolution. Furthermore with steady state current in the windings the rotor has a substantial holding torque.

The motor translator module converts the incoming control pulses into the correct sequence to energize the stator windings of the motor. Forward and reverse input lines select the correct sequence for directional control and the frequency of the signal pulses to the translator module determine the actual speed of the motor. The speed range of the electrode traverse can be 0.2–12 rpm. Pulses of constant frequency to the motor translator will result in precise electrode movements of constant frequency.

When the electrode is stationary, maximum penetration occurs and when using the technique of modulated electrode movement it is found that the weld takes the form of a series of precisely positioned over-lapping spot welds. This technique has been found to have advantages when welding difficult materials such as Inconel.

Figure 4:
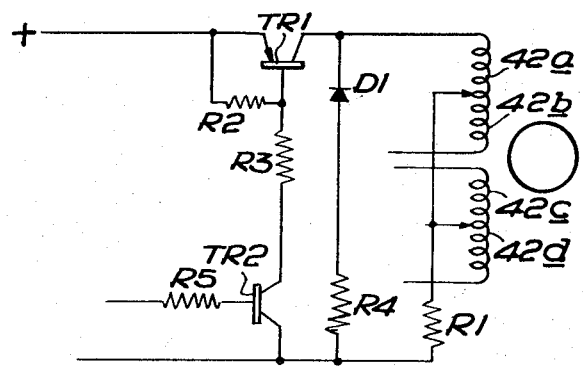

Referring to FIG. 4 there is shown one of four identical sections making up the motor power amplifier 43 in FIG. 3. The motor 42 has four stator windings 42a, 42b, 42c and 42d, one section of the amplifier 43 being connected with each winding so as to energize each winding individually.

The section shown is connected to the winding 42a. One terminal of the winding 42a is connected to the negative terminal of a power supply via a resistor R1. The other terminal of the winding 42a is connected to the collector of a PNP silicon power transistor TR1 whose emitter is connected to the positive terminal of the supply. The base of transistor TR1 is biased by means of resistor R2 connected between the base and positive terminal of the supply. The base control signal for the transistor TR1 is supplied by an NPN drive transistor TR2 whose collector is connected to the base of transistor TR1 via a resistor R3. The emitter of transistor TR2 is connected to the negative terminal of the supply. Transient voltages across the winding 42a are suppressed by a reverse biased diode D1 and resistor R4 in series between the terminals of the supply. The signal from the motor control translator 44 corresponding to the required state of energization of the winding 42a is fed to the base of the transistor TR2 via a resistor R5.

The winding 42a is either energized or de-energized depending on whether transistor TR2 does not conduct or conducts respectively. If the transistor TR2 conducts, transistor TR1 does not conduct and if transistor TR2 does not conduct then transistor TR1 conducts.

Figure 5:
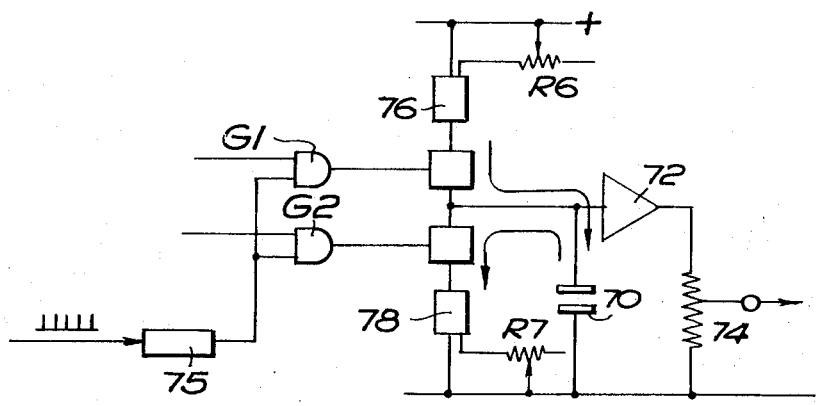

Referring to FIG. 5 there is shown that part of the command logic 46 which regulates the arc current. The arc current is determined in relation to the electrode traverse by means of a current "slope" control. Two gates G1 and G2 are provided for increasing arc current and decreasing arc current respectively. The gates G1 and G2 are connected to, so as to control, switches S1 and S2 respectively. The switches S1 and S2 are connected in series with constant current supply circuits 76 and 78 respectively, these circuits 76 and 78 being connected to a stabilized power supply and being set by means of potentiometers R6 and R7 respectively. A capacitor 70 is connected between one terminal of the stabilized supply and a point between the two switches S1 and S2. The capacitor 70 can thus be charged through the switch S1 and discharged through the switch S2 at a rate determined by the value of the constant current through the circuits 76 and 78 respectively, these values being set by means of the potentiometers R6 and R7 respectively. Also the voltage across the capacitor 70 depends on the frequency and time duration of the switching of the switches S1 and S2. A buffer amplifier 72 and potentiometer 74 are connected in series, this series arrangement being connected in parallel with the capacitor 70. The output of the potentiometer 74 is connected to the current control amplifier 39.

The gates G1 and G2 each have two inputs. One input to each gate comprises pulses derived from the generator 50 via the counter 59 and program logic 46a. These pulses are fed to a multivibrator unit 75 which produces pulses of a substantially constant time duration which occur in synchronism with the incremental movements of the stepping motor. An "increase" signal is supplied to the other input of the gate G1 while a "-decrease" signal is supplied to the other input of the gate G2 when the program requires the voltage across the capacitor 70 to be increased or decreased respectively. When the voltage is to be increased a steady "increase" signal is applied to the gate G1 and the capacitor 70 is charged in steps due to the multivibrator pulse being applied to the gate G1 which causes the switch S1 to conduct a steady current for the duration of each pulse applied to the gate G1. This causes the voltage across the capacitor 70 to increase in regular steps, this increase being transmitted to the welding power source 38 so as to give a steady linear increase in arc current. For steady arc current no "increase" or "decrease" pulse is applied to either of the gates G1 or G2.

Figure 6:
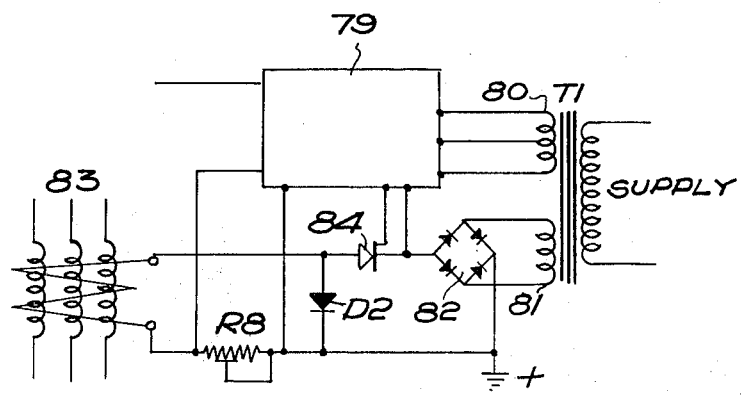

Referring to FIG. 6 the current control amplifier 71 which is shown in detail is supplied with power via a transformer T1. The control signal output from the command logic 46 is connected to a terminal X of a phase-shift control module 79 which is also connected to a winding 80 of the transformer T1. Another winding 81 of the transformer is connected across a rectifier bridge 82 which provides a D.C. supply across the control winding of a transductor 83. The positive terminal of this D.C. supply is connected to earth. A silicon controlled rectifier, or thyristor 84 is connected in series with the control winding of the transductor 83 and the thyristor is controlled by the module 79. A reverse biased diode D2 is connected across the output of the rectifier bridge 82 to protect the thyristor 84 from reverse surge voltages. A pre-set variable resistor R8 is also connected in series with the control winding of the transductor. Feedback connection is made from the terminal of the control winding connected to the resistor R8 to the module 79. Connection across the D.C. output of the bridge 83 is made to the module 79. The output of the transductor 83 is connected to the welding power source 38.

Figure 7:
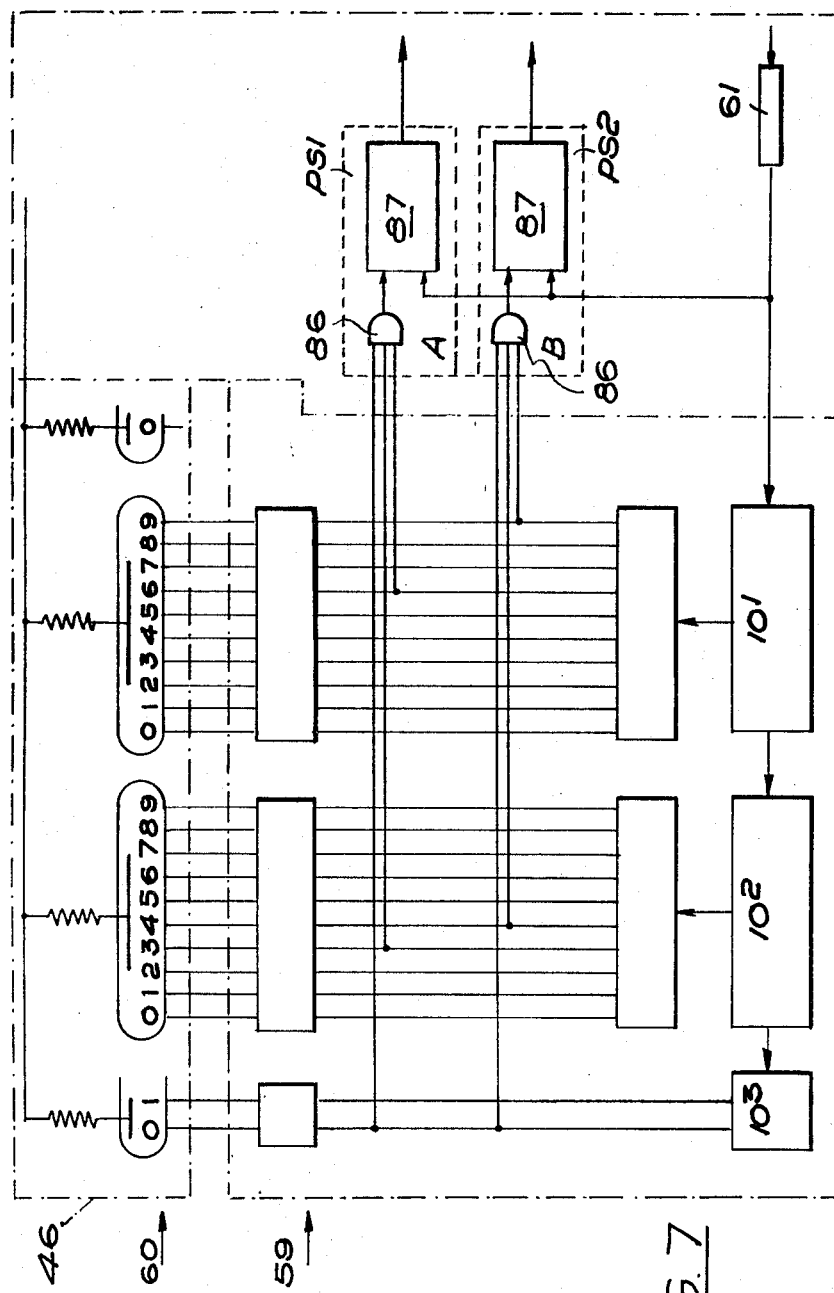
FIG. 7 shows program switches and display.

Referring now to FIG. 7 the counter 59 is of conventional design having a counting capacity of 199 pulses. The pulses are supplied via the divider 61 and are 10° apart so that the readout 85 of the counter 59 has a fixed zero in the units readout. The counter thus counts over an electrode traverse range of 1,990° before resetting. Connections are made from the counter 59 to the program logic which incorporates position switches two of which PS1 and PS2 are shown. Each switch such as PS1 comprises an AND gate 86 connected to and controlling a bistable 87. Each bistable 87 gives an output only when the number registered in the counter 59 corresponds to the connections made from the counter to the AND gate controlling that particular bistable. The bistables are triggered using the pulses from the divider 61 as clock pulses.

The operation of the apparatus shown in FIG. 3 will now be outlined. The program plug 64 is plugged into the socket 62. The apparatus is then switched on at the operator controls 46c. The command logic then starts the welding procedure by initiating the arc via the high frequency arc starter in the welding power source 38.

At the same time the command logic starts controlling the output of the generator 50. The pulse output from this generator drives the motor 42 via the dividing circuit 69 if the modulation is OFF or via the gate 68 if the modulation is ON, the modulation being ON or OFF depending on the state of the switch 45 which is controlled by the control logic 46b. As the welding progresses the counter 59 supplies the command logic 46 with information on electrode position. The command logic 46 controls the generator 50, the switch 45, the arc current and the electrode adjustment according to the program the different steps in the program being effectively triggered by the counter 59 The modulation control depends not only on the potentiometer 56 but also on the output pulse frequency from the generator 50. This output pulse frequency is integrated with respect to time by the circuit 57 and the resulting analogue signal representing motor speed is displayed on the tachometer 58. The arc current feedback to the amplifier 71 and the command logic 46 gives a check on arc current and allows automatic correction of the arc current as the welding proceeds.

The average speed of the motor is controlled by the pulse generator 50 with a linear voltage/frequency characteristic; the nominal speed can be set by the potentiometer 52 and further speed adjustments can be made by low level signal inputs from the command logic 46 thus allowing weld penetration adjustments related to the position of the electrode around the periphery of the weld. The modulating action is produced by a pulse dividing technique in which the "-gate" 68 allows a certain number of pulses to pass through and then inhibits a number of pulses to produce the pattern shown at the left hand side of FIG. 2 between $t_1$ and $t_3$. Typical values of "Weld Pitch" that can be preselected by means of the modulation control 54 and/or the electrode speed control unit 48 are 2.5°, 5°, 10°, 20°, 40°, these values produce circumferential distances of approximately 0.016 inch, 0.033 inch, 0.066 inch, 0.132 inch, and 0.264 inch respectively for a diameter of three-fourths inch.

The modulation in effect reduces the average motor speed and in order to preserve the same average speed when switched to unmodulated operation, the control pulses are divided by means of the circuit 69, by a factor depending on the modulation ON/modulation OFF ratio of motor speed.

Referring now to FIG. 8, this illustrates a typical welding program which can be employed using the apparatus just described, electrode speed in r.p.m. and arc current in amps being plotted against angular position of the electrode.

The program includes:
a. A slow initial speed to provide the necessary heat build-up.
b. An increased speed for the remaining section, with a suitable overlap at 360°.
c. The current is gradually reduced to the minimum level with the electrode speed unmodulated.
d. The electrode is accelerated and when at maximum speed, the welding current is switched off.

The zones at c and d are important in order to produce the ideal weld termination. The current down slope gradually reduces weld penetration, this is further reduced by accelerating the electrode and the tendency to produce a crater at the point where welding current is switched off is therefore eliminated.

A suitable program can be established in a test procedure by the use of a "program simulator" which plugs into the program socket. This unit is essentially a pluggable patch board which permits the selection of parameter changes and the angular position at which these changes in the zone (c) occur. The program positions can be selected from zero to the full capacity of the digital counter (1990°) in increments of 10°, changes in electrode traverse speed; modulation; arc current and when necessary electrode position are possible. When the program giving optimum results has been established, a program plug can be wired with suitable links and so provide an instant and repeatable weld procedure for future use.

Various other modifications may be made without departing from the scope of the invention, particularly to the control apparatus for varying the rate of movement of the electrode. For example, the electrode could be driven by a constant speed motor through variable speed gearing and Geneva mechanism.

What I claim and desire to secure by Letters Patent is:

1. Method of electric welding comprising, at least the steps of, positioning a non-consummable electrode closely adjacent a location on an assembly to be welded along the desired weld path moving such electrode along such desired weld path, providing a constant weld current to such electrode, and alternately accelerating and decelerating the rate of travel of such electrode along the weld path in regular intervals, the decelerating movements being of a rate and duration such that the constant current releases a quantity of energy sufficient to form a spot weld during each such period of decelerated movement, the accelerating movement being of a rate and duration such that the energy released is insufficient to form a weld and the intervals being such as to produce a continuous weld constituted by a series of spot welds which overlap by a predetermined and regular extent.

2. Method defined in claim 1 wherein the increments are selected to provide a degree of overlap of adjacent spot welds expressed as a percentage of the size of each spot weld in excess of 10 percent and less than 90 percent.

3. Method defined in claim 1 wherein such acceleration and deceleration are substantially equal so that said step of moving comprises periods of alternating advance and dwell of the electrode along the weld path.

4. Method defined in claim 1 particularly for welding an assembly comprising an end portion of a tube of a heat exchanger mounted in general alignment with a closely fitting aperture of a tube plate wherein the electrode is smaller than said tube, said step of positioning comprising inserting an end portion of such electrode into the bore of the tube in generally radial alignment with the plate and said step of moving comprises moving such electrode within the tube bore along a generally circular path.

5. Method defined in claim 4 wherein said electrode extends generally outwardly of an electrode holder rotatably supported generally axially of said tube bore wherein said step of moving comprises rotating such holder.

6. Method defined in claim 5 wherein the electrode is driven by a rotary stepping motor and said step of rotating comprises, at least the steps of, furnishing a train of pulses to such motor and selectively blocking groups of such pulses to provide such dwell.

* * * * *